(12) United States Patent
Kirk

(10) Patent No.: US 6,365,214 B1
(45) Date of Patent: Apr. 2, 2002

(54) COOKING OIL SPONGE

(76) Inventor: David E. Kirk, 3553 Auburndale St., San Diego, CA (US) 92111

( * ) Notice: Subject to any disclaimer, the term of this patent is extended or adjusted under 35 U.S.C. 154(b) by 0 days.

(21) Appl. No.: 09/518,618

(22) Filed: Mar. 3, 2000

Related U.S. Application Data

(60) Provisional application No. 60/145,481, filed on Jul. 23, 1999.

(51) Int. Cl.[7] .................................................. A23D 9/02
(52) U.S. Cl. .................... 426/330.6; 426/417; 426/422; 426/424; 426/438; 210/502.1; 210/503; 210/509; 210/238; 210/470; 210/471
(58) Field of Search .............................. 426/330.6, 422, 426/423, 424, 438, 77, 78, 84, 113, 417; 210/DIG. 8, 502.1, 503, 507, 508, 509, 238, 470, 484, 471

(56) References Cited

U.S. PATENT DOCUMENTS

| | | | |
|---|---|---|---|
| 3,464,920 A | | 9/1969 | Pirson et al. |
| 3,591,524 A | | 7/1971 | Eriksen |
| 3,673,095 A | * | 6/1972 | Archer ........................ 252/88 |
| 3,791,990 A | * | 2/1974 | Fischer |
| 3,846,320 A | * | 11/1974 | Edwards ..................... 210/471 |
| 3,849,312 A | * | 11/1974 | Wecker, Sr. ................. 210/470 |
| 3,955,004 A | * | 5/1976 | Strauss ........................ 426/253 |
| 4,052,319 A | * | 10/1977 | Friedman .................... 210/471 |
| 4,112,129 A | * | 9/1978 | Duensing .................... 426/417 |
| 4,226,237 A | * | 10/1980 | Levesque .................... 128/285 |
| 4,349,451 A | * | 9/1982 | Friedman .................... 252/190 |
| 4,366,068 A | * | 12/1982 | Ostreicher .................. 210/767 |
| 4,473,440 A | * | 9/1984 | Ovans ......................... 162/148 |
| 4,519,918 A | | 5/1985 | Ericsson et al. ............. 210/680 |
| 4,642,184 A | * | 2/1987 | Liepse ......................... 210/470 |
| 4,676,871 A | * | 6/1987 | Cadieux ....................... 162/13 |
| 4,681,768 A | * | 7/1987 | Mulflur ....................... 426/417 |
| 4,701,438 A | * | 10/1987 | Taylor ......................... 426/417 |
| 4,735,815 A | * | 4/1988 | Taylor ......................... 426/417 |
| 4,764,384 A | * | 8/1988 | Gyann ......................... 426/417 |
| 4,851,273 A | * | 7/1989 | Brown ......................... 428/287 |
| 4,880,652 A | * | 11/1989 | Regutti ....................... 426/417 |
| 4,923,725 A | | 5/1990 | Zafiroglu .................... 428/364 |
| 4,950,524 A | * | 8/1990 | Hacker ....................... 428/163 |
| 5,009,790 A | * | 4/1991 | Bustamante ................ 210/689 |
| 5,068,115 A | * | 11/1991 | Liebermann ................ 426/77 |
| 5,077,070 A | * | 12/1991 | Regutti ....................... 426/417 |
| 5,084,177 A | * | 1/1992 | Keene ......................... 210/470 |
| 5,151,194 A | * | 9/1992 | Simpson ..................... 210/680 |
| 5,228,985 A | * | 7/1993 | Wells et al. ................. 210/470 |
| 5,232,595 A | * | 8/1993 | Meyer ....................... 210/493.1 |
| 5,391,385 A | * | 2/1995 | Seybold ...................... 426/417 |
| 5,414,248 A | | 5/1995 | Phillips ....................... 219/730 |
| 5,462,785 A | | 10/1995 | Holland ....................... 428/76 |
| 5,477,658 A | * | 12/1995 | Berger ......................... 53/399 |
| 5,526,737 A | * | 6/1996 | Betzen ......................... 210/470 |
| 5,597,600 A | * | 1/1997 | Munson ..................... 426/330.6 |
| 5,601,715 A | * | 2/1997 | Middleton et al. .......... 210/470 |
| 5,699,915 A | * | 12/1997 | Berger ......................... 206/597 |
| 5,707,527 A | * | 1/1998 | Knutson ...................... 210/660 |
| 5,744,406 A | * | 4/1998 | Novak ......................... 442/121 |
| 5,814,396 A | * | 9/1998 | Weidner ...................... 428/213 |
| 5,948,266 A | * | 9/1999 | Gore et al. .................. 210/470 |
| 5,992,306 A | * | 11/1999 | Chiang ........................ 210/470 |
| 6,187,355 B1 | * | 2/2001 | Akoh ........................ 426/330.3 |

\* cited by examiner

*Primary Examiner*—Carolyn Paden
(74) *Attorney, Agent, or Firm*—Brian J. Pangrle; Rod D. Baker

(57) ABSTRACT

An apparatus for absorbing, containing, immobilizing, transporting and disposing of quantities of used cooking oil and/or other oils and hydrocarbons, comprising decomposed organic matter and/or inorganic matter.

19 Claims, 2 Drawing Sheets

COOKING OIL SPONGE

CROSS-REFERENCE TO RELATED APPLICATIONS

This application claims the benefit of the filing of U.S. Provisional Patent Application Serial No. 60/145,481, entitled "Cooking oil sponge," filed on Jul. 23, 1999, and the specification thereof is incorporated herein by reference.

BACKGROUND OF THE INVENTION

1. Field of the Invention (Technical Field)

The present invention relates to apparatuses and methods for handling and disposal of oil, including cooking oils and motor oils.

2. Background Art

From heating to lubricating to cooking. Americans use millions of gallons of oil every day. In nearly every use, oil containment is an important consideration because spilt oil can present a hazard. Therefore, new, practical and versatile apparatuses and methods of containment are needed.

A variety of food preparation processes rely on oil as a heat transfer medium. In such processes the volume of cooking oil used varies on a scale ranging from a spoonful to gallons. In general, cooking oil is placed in a cooking appliance, such as, but not limited to, a pan, deep fryer and the like. Of course, the volume of oil used in a food preparation process depends on the amount of food to be prepared and whether the appliance is designed for residential or commercial use. In such uses, the ease of oil containment during and after cooking along with oil cleanup and disposal after use are important factors in determining the overall safety and economics of a food preparation process.

In residential environments, used cooking oil is often collected, stored and disposed of in a container, such as, a coffee can or mayonnaise jar. This common practice requires careful handling of the oil while removing it from the cooking appliance, transferring it to the container, transporting the container, and storing the container until it eventually becomes full and ready for disposal. Each step heightens the potential for a mess, accident and/or hazardous spill. Additionally, the practice of disposing of oil in makeshift containers and placing such containers in household waste acts to shift hazard from the home to the waste carrier. Although chemically different than used motor oil, which is in many states classified as a household hazardous waste, used cooking oil presents many of the same problems. For example, motor oil and cooking oil present the same hazardous conditions in the case of road and/or walkway spills. Methods and apparatuses that contain better motor and/or cooking oil will act to minimize spills.

Regarding disposal of oil, many dumpsites and/or landfills classify free liquids, such as oil, as unacceptable material. Free liquids are prone to migration and once migration begins such liquids can create a hazard by extracting and transporting other previously "fixed" materials. Ultimately, ground and ground water contamination result. As applied to cooking oil, the magnitude of the hazard is realized when one considers that the retail market share of cooking oil purchased for private use exceeds seventy five million (75,000,000) gallons annually in the United States.

Several U.S. Patents disclose articles that use peat for the purpose of absorbing fuel oils, motor oils, hydrocarbons and the like from contaminated ground and water. U.S. Pat. No. 4,519,918, entitled "PROCESS FOR THE ABSORPTION OF ORGANIC LIQUIDS BY USE OF A HYDROPHOBIC FIBROUS MATERIAL," to Ericsson et al., issued May 28, 1985 discloses treatment of fibrous peat by impregnation with 5% by weight of an acrylate prepolymer followed by heating and subsequent granulation or shredding. This patent then discloses use of this material to remove a surface layer of oil floating on water. U.S. Pat. No. 3,464,920, entitled "METHOD OF REMOVING OIL FROM THE SURFACE OF WATER USING OLEOPHILIC HYDROPHOBIC COMMINUTED ORGANIC MATERIAL," to Pirson et al., issued Sep. 2, 1969 discloses use of peat treated with organosilanes to absorb mineral, animal and plant oil products contaminating water surfaces. U.S. Pat. No. 5,151,194, entitled "FILTER FOR REMOVING LIQUID HYDROCARBONS FROM WATER AND PROCESS OF REMOVING GASEOUS AND/OR HYDROCARBONS FROM WATER," to Simpson et al., issued Sep. 29, 1992 discloses a filter for removing hydrocarbon from water wherein the filter medium is fibrous peat dried to a moisture content of less than 5% by weight. U.S. Pat. No. 3,791,990, entitled "OIL ABSORBENT," to Fischer, issued Feb. 12, 1974 discloses use of peat having a moisture content of less than 10% by weight for removing oil film from water. U.S. Pat. No. 3,591,524, entitled "OIL ABSORBENT," to Eriksen, issued Jul. 6, 1971 discloses a process for preparing an oil absorbent for absorbing oil in the presence of water that is floatable on water with an emulsion emulsified by ammonia or an amine salt. These patents are directed to chemically and physically treating peat for subsequent separation and absorption of oil from water.

Articles exist for the purpose of collecting and disposing of grease and oil by-products from food oils and such articles are disclosed in the following U.S. Patents: U.S. Pat. No. 5,744,406, entitled "METHOD FOR EASY REMOVAL OF FATS, OILS AND GREASE FROM MIXTURES WITH WATER AND AQUEOUS," to Novak, issued Apr. 29, 1998; U.S. Pat. No. 5,814,396, entitled "GREASE ABSORBING PAD," to Weidner, issued Sep. 29, 1998; U.S. Pat. No. 4,923,725, entitled "ARTICLE FOR ABSORBING COOKING GREASE," to Zafiroglu, issued May 8, 1990; and U.S. Pat. No. 4,950,524, entitled "BACON PAD," to Hacker, issued Aug. 21, 1990. None of these patents disclose use of peat for absorbing oil.

The articles disclosed in the aforementioned patents all have shortcomings and thus a need continues to exist for a more effective article and/or method that can easily, automatically, effectively, and quickly absorb, immobilize and contain quantities of oil. The need is particularly acute for cooking oils because, in part, they are more likely to enter the environment due to a lesser degree of regulation compared to motor oils. The aim of the present invention is to fill this need for all oils and particularly cooking oils.

SUMMARY OF THE INVENTION

Disclosure of the Invention

The present invention comprises an oil absorbent apparatus comprising an outer layer housing an oil absorbent core comprising, for example, decomposed organic matter and/or inorganic matter. According to the apparatus of the present invention, decomposed organic matter includes, but is not limited to, compost and humus. In a preferred embodiment of the present invention, the oil absorbent core comprises peat, preferably sphagnum peat. In a preferred embodiment of the present invention, the oil absorbent core comprises an inorganic material, for example, but not limited to, perlite and/or vermiculite. According to the apparatus of the present invention, a core optionally comprises a substantially solid, porous mass of matter; loose particles of matter, optionally in discrete clusters; and/or a plurality of discrete substantially solid, porous masses of matter, for example, but not limited to, pellets. Decomposed organic matter and inorganic matter are commercially available in a variety of forms, such as, but not limited to, the aforementioned masses, clusters and particles.

In a preferred embodiment of the present invention, the apparatus comprises at least one inner layer. In a preferred embodiment, at least one inner layer is positioned between a core and an outer layer. In another preferred embodiment, the core comprises a plurality of discrete substantially solid, porous masses and/or a plurality of discrete clusters of loose particles of matter wherein at least one inner layer is positioned between discrete masses and/or discrete clusters. In a preferred embodiment of the apparatus of the present invention, at least one of the at least one inner layer comprises a filter for filtering matter. In a preferred embodiment, the outer layer comprises a filter for filtering matter. Such matter includes, for example, debris, decomposed and/or inorganic matter and the like.

In a preferred embodiment of the present invention, the apparatus comprises at least one handle. The at least one handle comprises, preferably, a natural material capable of withstanding temperatures associated with oil used for cooking. In a preferred embodiment of the inventive apparatus, the outer layer comprises a member selected from the group consisting of muslin, cotton, plastic, metal, glass and composite material. In a preferred embodiment, the apparatus comprises at least one inlet for uptake of oil. In a preferred embodiment, the apparatus comprises a mechanism for opening and closing (or sealing) the at least one inlet for uptake of oil. In a preferred embodiment, the inlet comprises a filter for filtering matter, preferably integral with an outer and/or at least one inner layer. In a preferred embodiment, the mechanism comprises a rotating and/or translating mechanism. Such mechanisms are known in the art of condiment, air freshener and/or household cleaner containers.

The present invention comprises a method of absorbing oil comprising the step of contacting with oil, an apparatus comprising an oil permeable outer layer housing an oil absorbent core comprising, for example, decomposed organic matter and/or inorganic matter. In a preferred embodiment, the apparatus comprises at least one inner layer. In a preferred embodiment, the oil absorbent core comprises peat and/or perlite. In a preferred embodiment of the method of the present invention the oil has a temperature greater than 150° F. In a preferred embodiment of the method of the present invention the oil has a temperature greater than 250° F. In a preferred embodiment of the method of the present invention the oil is in contact with a food.

In a preferred embodiment, the apparatus of the present invention retains and/or immobilizes oil when exposed to, for example, pressure and/or gravity. In a preferred embodiment, the apparatus of the present invention retains and/or immobilizes absorbed oil to greater than approximately 90%, and preferably greater than approximately 95%, when exposed to, for example, pressure and/or gravity, as disclosed infra.

A primary object of the present invention is to absorb oil, particularly cooking oil, both during and/or after cooking.

A primary advantage of the present invention is safe and efficient absorption of oil and ease of disposal.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
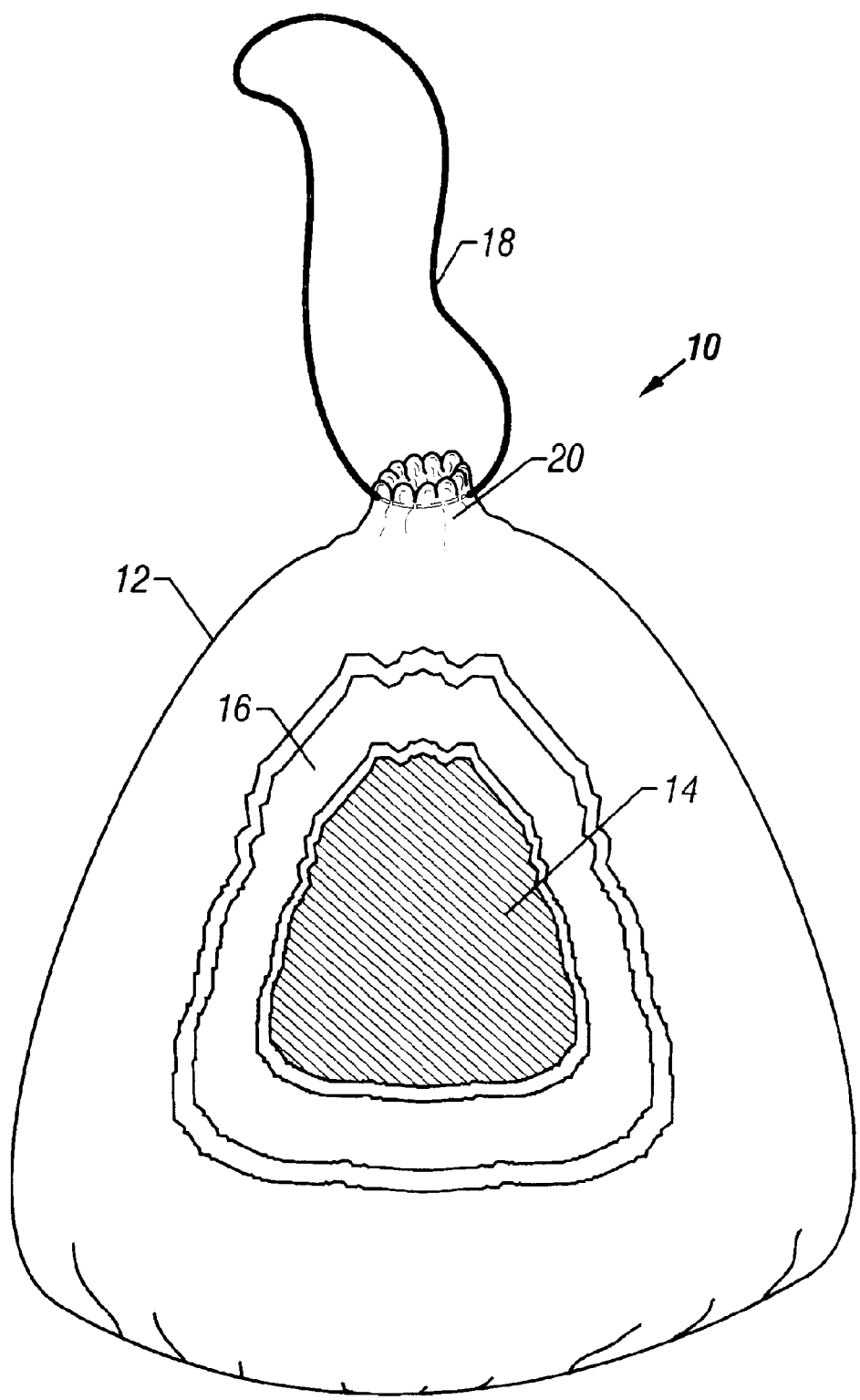
FIG. 1 illustrates the preferred oil absorbing apparatus of the present invention.

As shown in FIG. 1, the present invention comprises an apparatus 10 for absorbing, containing, immobilizing, transporting and/or disposing of used oils, particularly cooking oils and greases. A preferred embodiment of the present invention apparatus comprises renewable, natural materials. In this embodiment, the inventive apparatus comprises an outer layer 12 and a core 14. In an alternative embodiment, the inventive apparatus comprises an outer layer 12, at least one inner layer 16, and a core 14. In several embodiments, the core 14 comprises organic or inorganic materials, such as, but not limited to, flour, peat, diatomaceous earth, furnace ash, perlite, vermiculite and like materials with oil absorption properties. In a preferred embodiment, the core 14 comprises peat moss, preferably sphagnum peat moss. Sphagnum peat moss is derived from the slow decomposition of sphagnum moss, which accumulates in bogs or "peatlands." In general, sphagnum peat moss is a natural organic material created in humid conditions by an accumulation of plant debris comprising sphagnum. The material decomposes slowly in the natural environment due to the lack of air, poor drainage, and acidic conditions of the milieu. Peat moss comprises a spongy, fibrous material. The porous structure allows for absorption of water in excess of ten times its dry weight. Overall, sphagnum peat has a relatively high content of organic material, a relatively low density, a relatively low concentration of microorganisms and antiseptic properties. Peat moss is also effective as a filter material to eliminate odors.

According to the present invention, decomposed and/or mineralized organic matter is suitable for use as core material. Decomposed organic matter comprises compost, which is partially decomposed organic matter, and humus, which is completely decomposed organic matter. Mineralized organic matter comprises decomposition processes that release inorganic compounds from organic matter. The term decomposition includes, for example, chemical, physical, thermal, and biological decomposition processes.

In another embodiment, the core 14 comprises perlite. Perlite is a naturally occurring silicous rock. A distinguishing feature of perlite is that when heated to a suitable point in its softening range, it expands from four to twenty times its original volume. Perlite typically comprises approximately one-third silicon based on an elemental analysis. Although the preferred embodiment of the present invention comprises peat moss, it is understood that substitution of other materials, such as, but not limited to, flour, diatomaceous earth, furnace ash, perlite, vermiculite and the like, is possible. Substitution comprises partial and/or full substitution of peat.

To facilitate handling, the preferred embodiment of the inventive apparatus comprises a handle 18. The handle 18 comprises a natural (fiber and/or metal) and/or synthetic material compatible with the conditions to which the apparatus is to be exposed. In a preferred embodiment, the handle comprises cotton, preferably a cotton string that also functions as a draw string for an outer 12 and/or inner layers 16 and/or material, including the core 14. In embodiments where the handle also functions as a mechanism for closing the outer layer 12 around the core 14, the core is optionally replaceable. For example, a used core 14 is removed from an expandable opening 20 in the outer layer and a new core 14 is inserted through the expandable opening 20. The handle 18, for example, a drawstring, is then pulled by the user to close the expandable opening 20 and "seal" in the new core 14. Of course, inner layer 16 material is optionally replaceable is a same or similar manner.

Use of the apparatus and methods of the present invention offer solutions currently unavailable in the market place, including, but not limited to, the following: oil is not poured onto the inventive apparatus but rather the inventive apparatus is placed in oil; the inventive apparatus automatically removes oil/grease from cooking appliances for fast and easy handling with greatly reduced personal contact with oil; the inventive apparatus significantly eliminates the potential for accidents and hazardous spills; the inventive apparatus is dripless; the inventive apparatus preferably comprises 100% natural, biodegradable, environmentally friendly waste suitable for landfill disposal or in a compost pile when used with cooking oil; the inventive apparatus preferably comprises all natural materials of construction; the inventive apparatus is economical and inexpensive; the inventive apparatus is easy to use and/or manufacture; the inventive apparatus optionally comprises food grade materials of construction; the inventive apparatus comprises materials optionally constructed in wide range of sizes; the inventive apparatus comprises a light weight making it inexpensive to ship and distribute; in general, the inventive apparatus allows ease of customer compliance with federal, state and local laws and regulations for handling and disposal of waste; proper use of the inventive apparatus reduces ground and ground water contamination; the inventive apparatus is disposable; the inventive apparatus optionally comprises material for absorbing all types of hydrocarbons, including oils; the inventive apparatus removes oil/grease during food preparation; the inventive apparatus removes oil/grease after food preparation; the inventive apparatus has a mechanical strength sufficient to contain the quantity of oil to be handled; the inventive apparatus allows handling without contact with the oil; in general, the inventive apparatus eliminates spills by immobilizing oil; and the inventive apparatus is disposable in landfills by converting free liquid oil/grease to a solid or semi-solid waste wherein the oil is effectively "bound".

Outer and Inner Layer Materials

In a preferred embodiment, at least the outer layer 12 and/or at least one inner layer 16 comprises natural, biodegradable fiber. In such an embodiment, the fiber comprises a mechanical strength sufficient to contain any inner layer 16, core 14 and quantity of oil to be contained. In yet another embodiment, at least the outer 12 and/or at least one inner layer 16 comprises a mechanical strength and integrity sufficient to withstand temperatures associated with cooking oil during and after food preparation without significant deterioration. In several embodiments of the present invention, where the apparatus is for use during cooking, thermal expansion and contraction characteristics of the inventive apparatus allow for increased oil transfer, absorption and containment. In a preferred embodiment, the inventive apparatus comprises a flexible material, as an outer 12 and/or inner layer 16, that expands as the core 14 absorbs oil and preferably, further comprises a material that can conform to physical contours of the cooking appliance in which it is used. In such an embodiment, the outer 12 and/or at least one inner layer 16 optionally comprises flexible material.

In a preferred embodiment of the present invention, the outer layer 12 functions as a container for containing at least one inner layer 16 and a core 14. In another preferred embodiment, at least one of the at least one inner layer 16 comprises a filter. Depending on the placement of the filter, material filtered optionally comprises, for example, core material, debris, chemicals and the like. In a preferred embodiment, the inventive apparatus comprises a container, a filter layer and a core comprising an oil absorbent material.

Figure 2:
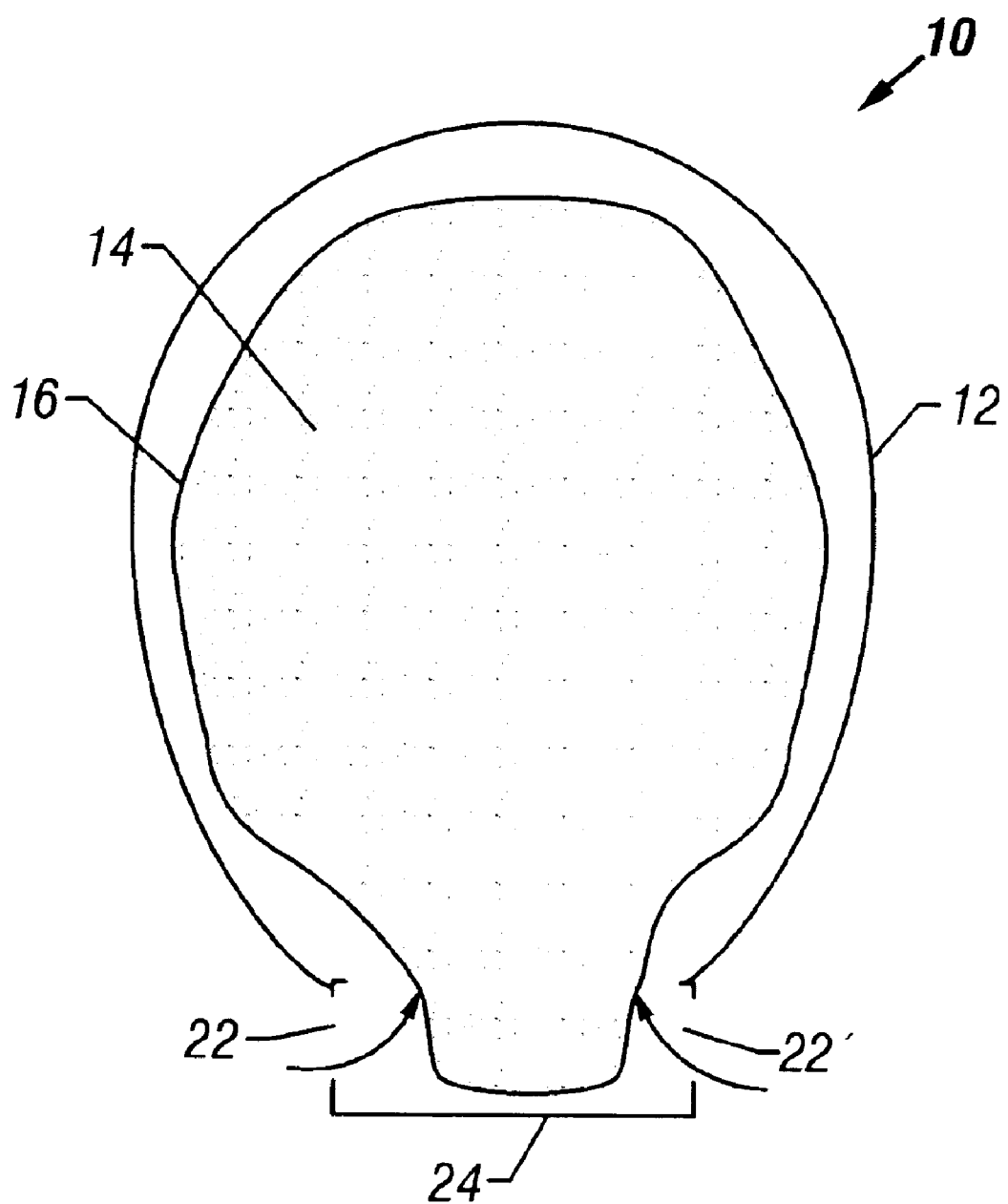
FIG. 2 illustrates the oil absorbing apparatus of the present invention comprising an inlet for uptake of oil.

The inventive apparatus preferably comprises at least one inlet for uptake of oil. In this embodiment, the at least one inlet is fitable with a filter and/or sealable with, for example, a lid, a drawstring, a zip-lock mechanism, a rotatable cap, a sliding seal or the like. Additionally, the at least one inlet is sealable through rotation and/or translation of one layer versus another layer. Furthermore, the at least one inlet is positionable on any layer of the inventive apparatus. An embodiment of the present invention comprising at least one inlet for uptake of oil is shown in FIG. 2. FIG. 2 is a cross-sectional view of an inventive apparatus comprising at least two inlets for uptake of oil 22, 22'. Arrows show the direction of oil flow into the apparatus. The portion of the outer layer 12 comprising the inlets 22, 22' is optionally rotatable in relation to another portion of the outer layer such that inlets 22, 22' are sealable. In such an embodiment, the mechanism for opening and sealing is a "rotatable cap" 24, like a "rotatable cap" known in the art of consumer household products, e.g., air fresheners, cleansers, and condiments. In a preferred embodiment, the rotatable cap side of the inventive apparatus is placed into cooking oil in a utensil or appliance. With the inlets open, oil enters the core and is absorbed. After use, the inventive apparatus is removed from the utensil or appliance and the inlets are sealed. In an alternative embodiment, the apparatus comprises a rigid outer layer 12 and optionally a flat portion distal or proximate to the inlet end. The optional flat portion allows for standing of the inventive apparatus. In yet another embodiment, the inventive apparatus is fittable on, or adjacent to, the edge of a utensil, such as, but not limited to, a frying pan. In such an embodiment, any inlet is designed to facilitate uptake of oil. Furthermore, the inventive apparatus is designed to minimize any weight imbalance caused by uptake of oil, for example, but not limited to, maintenance of a low center of gravity of the apparatus. Alternatively, the inventive apparatus is fittable to a lid and/or a handle of the utensil, or the inventive apparatus is integral with a functional utensil, such as, but not limited to, a spatula.

Core Material

According to the apparatus of the present invention, a core 14 optionally comprises a substantially solid, porous mass of matter; loose particles of matter, optionally in discrete clusters; and/or a plurality of discrete substantially solid, porous masses of matter, for example, but not limited to, pellets. Decomposed organic matter and inorganic matter are commercially available in a variety of forms, such as, but not limited to, the aforementioned masses, clusters and particles. According to the present invention, the core 14 comprises an oil absorbent matter, also referred to as an oil absorbent material. In a preferred embodiment, the core 14 comprises a material comprising characteristics such as natural and/or biodegradable. Such core materials include, but are not limited to, fiber. In a preferred embodiment, core material comprises a compressibility that allows for a reduced size prior to use as an oil absorbent. For example, a core material that comprises compressibility to at least fifty percent of its normal un-laden volume is preferred. It is understood that core material is expandable upon opening of a package for packaging the inventive apparatus and/or upon absorption of oil. Vacuum packaging is commonly known in the packaging art is suitable for keeping the inventive apparatus at a reduced volume prior to use.

In a preferred embodiment of the present invention, core material effectively immobilizes absorbed oil. In such instances, the oil no longer behaves as a "free liquid," but rather, the oil is effectively "bound." The term bound includes, but is not limited to, the degree of binding exhibited in the experiments herewith disclosed. Of course, lesser degrees of binding are also covered by the definition of bound. Overall, the thrust of "bound" is thus, that the oil is disposable accordingly as a "solid" and/or "semi-solid." In instances, where the core material and absorbed oil reach a temperature equal to or below that at which the oil substantially solidifies, the oil is disposable as a solid.

In a preferred embodiment of the present invention, the core material comprises a heat resistant material that withstands cooking oil temperatures. Furthermore, thermal expansion properties of the core material allow for increased oil transfer, absorption and containment. In a preferred embodiment, the core material comprises a flexible material that expands as oil is absorbed and preferably, the core material further comprises a material that can conform to physical contours of the cooking appliance in which it is used.

According to the present invention, outer layer 12 material includes, but is not limited to, muslin and/or cotton. A drawstring bag for use as an outer layer material is available at most craft stores, including the Sand Diego Bag Company, San Diego, Calif. According to the present invention, handle material comprises, for example, but is not limited to, muslin and/or cotton. In alternative embodiments described supra, outer layer material comprises a rigid material capable of withstanding the conditions to which the apparatus is to be exposed. Such rigid materials comprise synthetic and natural materials which are, for food applications of the present invention, available in food grades. Such materials include metals, plastics, glasses and composites.

According to the present invention, inner layer material includes, but is not limited to, tissue paper used commonly for gift wrapping, which is available at most department stores. Alternatively, synthetic and/or natural materials are suitable. Such materials include metals, plastics, glasses and composites.

According to the present invention, core material includes, but is not limited to, Canadian Sphagnum Peat Moss available at home and garden supply stores such as Sun Gro Horticulture Inc., Bellevue, Wash.

Throughout this disclosure, it is understood that oil is used broadly and that the term "oil" comprises grease, fat and oil (both natural and synthetic). Oil also includes materials that, in a liquid state, comprise hydrophobic properties similar to oil.

The present invention also comprises a novel method of use for the inventive oil absorbent apparatus. The following is exemplary of such a method.

Method I

Rather than pouring oil in a kitchen sink drain, letting it sit around and/or looking for a container to pour it into, after preparation of food in a deep fryer, the inventive apparatus is grasped by the handle and placed directly into the cooking oil in the fryer. Immediately and automatically through a process comprising capillary action, the inventive apparatus begins to absorb the used cooking oil from the fryer. The oil is absorbed into the core material through an outer container layer an inner, filter layer. As the inventive apparatus continues to absorb the used oil, the core material expands and, due to the forces of gravity, molds itself to the shape of the cooking appliance, thereby increasing its contact with the oil to be absorbed. Once the oil is absorbed from the fryer, or upon reaching an equilibrium and/or a saturation condition, the inventive apparatus is grasped by the handle and disposed in the garbage or, for example, in a compost pile.

The present invention also comprises an alternative novel method of use for the inventive oil absorbent apparatus. The following is exemplary of such an alternative method.

Method II

When cooking bacon and/or other fatty foods, rather than pouring the fat in the kitchen sink drain or letting it sit around, and/or looking for a container to pour it into, during the cooking of the bacon the inventive apparatus is placed directly into the frying pan or cooking appliance with the bacon as the bacon begins to cook and while fat/oil is released into the pan. The inventive apparatus immediately and automatically begins to absorb the fat/oil from the frying pan and/or appliance into and through its container layer into contact with the filter, into and through its filter layer and into its core. In this method, absorption of fat/oil into the inventive apparatus acts to reduce fire hazard because the oil is wicked away from the heat. The inventive apparatus also reduces the amount of oil in the pan and/or appliance by the amount absorbed. This reduces the amount of hot oil in the pan and thus minimizes detrimental effects from instabilities that may develop in a given depth of hot oil. In essence, unstable convection currents are minimized—such currents leads to unstable conditions, such as sloshing, in heated and especially boiling liquids. Of course, control of cooking temperature is advised to prevent burning of fat/oil that remains in the pan and to prevent the bacon itself from burning.

Industrial Applicability

The invention is further illustrated by the following non-limiting examples. The performance of the inventive apparatus in collecting, containing, stabilizing, transporting and disposing of cooking oil was demonstrated by the following examples and test procedures.

EXAMPLE/TEST NO. 1

For oil/grease absorption test from a deep fryer, approximately 883 grams of cooking oil was placed into a deep fryer weighting approximately 1,293 grams. The total weight of the deep fryer and oil was approximately 2,176 grams. The fryer was energized and the oil heated to cooking temperature of approximately 400° F. The fryer was then de-energized and no longer heating the oil as when finished cooking food. The total weight of the deep fryer and oil was approximately 2,174 grams. The inventive apparatus comprising a handle, a container, a filter and a core (comprising of nine cups of peat moss having a weight of approximately 317 grams) was grasped by the handle and placed in the oil in the fryer. The cooking oil was at a temperature of approximately 389° F. and began to cool to room temperature. By way of capillary action, and/or other physical phenomena, the inventive apparatus, upon contact with the oil, began to absorb the oil from the fryer. After an approximately 30 minute period the invention was removed from the fryer and weighed, where it had a weight of approximately 1,165 grams due to the oil it had absorbed. Approximately 9 grams of oil remained in the fryer as recognized by the total weight of the deep fryer and oil being approximately 1,302 grams.

Conclusion: The inventive apparatus absorbed approximately 99% of the cooking oil from the deep fryer.

EXAMPLE/TEST NO. 2

Upon completion of the oil/grease absorption test from a deep fryer, the oil/grease immobilization test was performed by placing the inventive apparatus used in Test No. 1 on a metal tray weighing approximately 331 grams. The inventive apparatus weighed approximately 1,165 grams. The tray and the invention having a total weight of approximately 1,495 grams was then placed in an electric oven preheated to approximately 350° F. After an approximately 60 minute period at approximately 350° F. the inventive apparatus was removed from the oven and found to weigh approximately 1,103 grams. Thus, the tray weighed approximately 350 grams indicating that approximately 19 grams of oil leached out of the inventive apparatus onto the tray.

Conclusion: Approximately 95% of the cooking oil remained immobilized in the inventive apparatus under the hostile test conditions.

EXAMPLE/TEST NO. 3

Within approximately 10 minutes of completion of the oil/grease immobilization test using heat, the invention weighing approximately 1,165 grams was hung by the handle so as to suspend the container, filter and core in the air over a metal tray weighing approximately 350 grams. After an approximately 24-hour period the inventive apparatus was found to weigh approximately 1,079 grams. Thus, the tray weighed approximately 387 grams.

Conclusion: Approximately 98% of the cooking oil remained immobilized with in the inventive apparatus.

EXAMPLE/TEST NO. 4

The invention used in Test No. 3 and weighing approximately 1,079 grams was placed in a metal tray weighing approximately 331 grams. A weight of approximately 90 pounds was placed on the inventive apparatus. After approximately 60 minutes the weight was removed. The inventive apparatus was found to weigh approximately 1,077 grams. Thus, the tray weighed approximately 320 grams and approximately 0 grams of oil was squeezed or leached out of the invention onto the tray.

Conclusion: Approximately 99% of the cooking oil remained immobilized with in the inventive apparatus under the hostile test conditions.

EXAMPLE/TEST NO. 5

For oil/grease absorption test from a frying pan while cooking bacon, approximately 208 grams of bacon was placed into a frying pan weighing approximately 1,124 grams and cooked for approximately 15 minutes on a stove top burner in a frying pan on medium at a temperature of approximately 210° F. As the bacon began to cook and oil/grease began to be released from the bacon. The inventive apparatus comprised a handle, a container, a filter and a core comprising (one cup of peat moss weighing approximately 36 grams) was placed into a frying pan with the cooking bacon. By way of capillary action the inventive apparatus upon contact with the oil/grease began to absorb the oil/grease from the frying pan. As the bacon continued to cook and oil/grease was released, the inventive apparatus continued to absorb oil/grease until cooking was complete and the stovetop burner was de-energized and no longer heating the frying pan. The invention was removed from the frying pan and found to weigh approximately 121 grams due to the approximately 86 grams of oil/grease it had absorbed. The cooked bacon weighed approximately 55 grams due to the oil/grease released and other cooking losses. The frying pan weighed approximately 1,123 grams due to the oil/grease remaining in the pan.

Conclusion: The inventive apparatus absorbed approximately 86 grams or approximately 99% of the oil/grease released into the frying pan from the bacon during cooking.

EXAMPLE/TEST NO. 6

Upon completion of the oil/grease absorption test from a frying pan while cooking bacon, the oil/grease immobilization test was performed by placing the inventive apparatus used in Test No. 5 weighing approximately 121 grams on a metal tray weighing approximately 257 grams. The tray and the inventive apparatus having a total weight of approximately 377 grams were then placed in an electric oven preheated to approximately 350° F. After an approximately 60 minute period at approximately 350° F. the inventive apparatus was removed from the oven and found to weigh approximately 116 grams. The tray was found to weigh approximately 257 grams.

Conclusion: Approximately 96% of the oil/grease remained immobilized in the inventive apparatus.

EXAMPLE/TEST NO. 7

Within approximately 10 minutes of completion of the oil/grease immobilization test using heat, the inventive apparatus used in Test No. 6 weighing approximately 116 grams was hung by the handle so as to suspend it in the air over a metal tray weighing approximately 257 grams. After an approximately 24-hour period the inventive apparatus weighed approximately 117 grams. The tray was found to weigh approximately 257 grams.

Conclusion: Approximately 100% of the oil/grease remained immobilized with in the inventive apparatus.

EXAMPLE/TEST NO. 8

The inventive apparatus used in Test No. 7 weighing approximately 117 grams was placed in a metal tray weighing approximately 259 grams. A weight of approximately 90 pounds was placed on the inventive apparatus compressing it. After approximately 60 minutes the weight was removed. The inventive apparatus was found to weigh approximately 117 grams. The tray was found to weigh approximately 258 grams. No measurable oil was squeezed or leached out of the inventive apparatus onto the tray.

Conclusion: Approximately 100% of the oil/grease remained immobilized with in the inventive apparatus.

TABLE 1

| | Period | Fryer, Pan, Tray weight (g) | Temp. (° F.) | Bacon weight (g) | Sponge weight (g) | Time | Absorbtion | Retention |
|---|---|---|---|---|---|---|---|---|
| Test No. 1 | | | | | | | | |
| Absorbtion Test from a 4 cup deep fryer after frying food. | Start | 2,176 | 400 | | 317 | 10.00 | | |
| | Finish | 1,165 | 90 | | 1165 | 10.30 | 99% | |
| Test No. 2 | | | | | | | | |
| Absorption test from frying pan during the cooking of bacon | Start | 1124 | 230 | 208 | 36 | 11.00 | | |
| | Finish | 1124 | 230 | 55 | 121 | 11.15 | 85% | |
| Test No. 3 | | | | | | | | |
| Retention/containment test while heating sponge on a tray in an electric oven. | | | | | | | | |
| Deep fryer sponge | Start | 331 | 350 | | 1165 | 13.00 | | |
| | Finish | 350 | 350 | | 1103 | 14.00 | | 95% |
| Frying Pan Sponge | Start | 257 | 350 | | 121 | 13.00 | | |
| | Finish | 257 | 350 | | 116 | 14.00 | | 99% |
| Test No. 4 | | | | | | | | |
| Retention/containment test with sponge suspended in air. | | | | | | | | |
| Deep fryer sponge | Start | 360 | 75 | | 1103 | 15.00 | | |
| | Finish | 387 | 75 | | 1079 | 14.55 | | 98% |
| Frying Pan Sponge | Start | 257 | 75 | | 116 | 15.00 | | |
| | Finish | 257 | 75 | | 116 | 14.55 | | 99% |
| Test No. 5 | | | | | | | | |
| Retention/containment test with sponge under 90 lb weight. | | | | | | | | |
| Deep fryer sponge | Start | 331 | 75 | | 1076 | 15.30 | | |
| | Finish | 331 | 75 | | 1076 | 16.30 | | 98% |
| Frying Pan Sponge | Start | 259 | 75 | | 117 | 15.30 | | |
| | Finish | 259 | 75 | | 117 | 16.30 | | 99% |

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications. patents, and publications cited above are hereby incorporated by reference,

What is claimed is:

1. An apparatus for absorbing oil comprising:
   an oil-permeable outer layer housing an oil absorbent core, said core comprising at least one member selected from the group consisting of decomposed organic matter and inorganic matter; and
   a handle connected to said outer layer;
   wherein said outer layer housing said core is at least partially immersible in oil by said handle, thereby to permit oil to pass through said outer layer for absorption by said core.

2. The apparatus of claim 1 wherein said oil absorbent core comprises peat.

3. The apparatus of claim 1 wherein said oil absorbent core comprises perlite.

4. The apparatus of claim 1 further comprising at least one inner layer.

5. The apparatus of claim 4 wherein said inner layer comprises a filter.

6. The apparatus of claim 1 wherein said outer layer comprises a member selected from the group consisting of muslin and cotton.

7. A method of absorbing oil comprising the steps of
   at least partially immersing in oil an apparatus comprising: an oil permeable outer layer housing an oil absorbent core; and
   allowing oil to pass through said outer layer housing said core to be absorbed by said core;
   wherein said core comprises at least one member selected from the group consisting of decomposed organic matter and inorganic matter.

8. The method of claim 7 wherein the apparatus comprises at least one inner layer.

9. The method of claim 7 wherein the oil absorbent core comprises peat.

10. The method of claim 7 wherein the oil absorbent core comprises perlite.

11. The method of claim 7 wherein the oil has a temperature greater than 150° F.

12. The method of claim 7 wherein the oil has a temperature greater than 250° F.

13. The method of claim 7 wherein the oil is in contact with a food.

14. An apparatus for absorbing oil comprising:

an outer layer housing an oil absorbent core, said core comprising at least one member selected from the group consisting of decomposed organic matter and inorganic matter;

a handle connected to said outer layer; and at least one sealable inlet in said outer layer for uptake of oil; wherein said outer layer housing said core is immersible in oil by said handle, thereby to permit oil to pass through said sealable inlet for absorption by said core.

15. The apparatus of claim 14 wherein said oil absorbent core comprises peat.

16. The apparatus of claim 14 wherein said oil absorbent core comprises perlite.

17. The apparatus of claim 14 further comprising at least one inner layer.

18. The apparatus of claim 14 wherein said outer layer comprises a member selected from the group consisting of plastic, metal, glass and composite material.

19. The apparatus of claim 14 wherein said sealable inlet comprises a member selected from the group consisting of rotating and translating sealing mechanisms.

* * * * *